United States Patent
Chen

(10) Patent No.: US 7,911,377 B2
(45) Date of Patent: Mar. 22, 2011

(54) METHOD FOR OBTAINING PRECISE TRACKING FREQUENCY OF GPS SIGNAL

(75) Inventor: Hung-Sheng Chen, Banqiao (TW)

(73) Assignee: Altek Corporation, Hsinchu (TW)

( * ) Notice: Subject to any disclaimer, the term of this patent is extended or adjusted under 35 U.S.C. 154(b) by 256 days.

(21) Appl. No.: 12/408,788

(22) Filed: Mar. 23, 2009

(65) Prior Publication Data

US 2010/0156716 A1 Jun. 24, 2010

(30) Foreign Application Priority Data

Dec. 24, 2008 (TW) ................................ 97150509 A

(51) Int. Cl.
G01S 19/00 (2010.01)
(52) U.S. Cl. .............................. 342/357.2; 342/357.12
(58) Field of Classification Search ................ 342/357.2
See application file for complete search history.

(56) References Cited

U.S. PATENT DOCUMENTS

| | | | | |
|---|---|---|---|---|
| 6,204,812 B1 * | 3/2001 | Fattouche | ...................... | 342/457 |
| 6,493,378 B1 * | 12/2002 | Zhodzishsky et al. | ........ | 375/149 |
| 6,633,255 B2 * | 10/2003 | Krasner | .................... | 342/357.63 |
| 6,684,158 B1 * | 1/2004 | Garin et al. | ................... | 701/213 |
| 6,853,678 B2 * | 2/2005 | Hasegawa et al. | ............ | 375/150 |
| 7,194,279 B2 * | 3/2007 | Mannerma | ...................... | 455/500 |
| 7,477,183 B2 * | 1/2009 | Watson et al. | ............ | 342/357.23 |
| 2003/0091107 A1 * | 5/2003 | Lobo et al. | ...................... | 375/150 |
| 2005/0151093 A1 * | 7/2005 | Zaugg | ........................ | 250/458.1 |
| 2006/0097914 A1 * | 5/2006 | Rao et al. | ................. | 342/357.12 |
| 2008/0122692 A1 * | 5/2008 | Houtman | ................. | 342/357.12 |
| 2009/0073038 A1 * | 3/2009 | Yoshioka | ................. | 342/357.12 |
| 2009/0316620 A1 * | 12/2009 | Simic et al. | .................... | 370/320 |

* cited by examiner

*Primary Examiner* — Thomas H Tarcza
*Assistant Examiner* — Frank McGue
(74) *Attorney, Agent, or Firm* — Stevens & Showalter LLP

(57) ABSTRACT

A method for obtaining a precise tracking frequency of a global positioning system (GPS) signal is described, which includes the following steps. A plurality of data from a satellite is continuously received. Each data has a tracking frequency. A plurality of phase differences of the received data is calculated. A phase difference average of the obtained phase differences is calculated. A frequency difference is calculated by the calculated phase difference average and a constant frequency parameter. A new tracking frequency is calculated by the frequency difference and a tracking frequency of the last data among the plurality of received data. A next data is received by the calculated new tracking frequency. A new tracking frequency is obtained by repeatedly calculating the average phase differences of the plurality of data received from the satellite and a constant frequency parameter, so as to obtain the most precise tracking frequency.

9 Claims, 3 Drawing Sheets

METHOD FOR OBTAINING PRECISE TRACKING FREQUENCY OF GPS SIGNAL

CROSS-REFERENCE TO RELATED APPLICATIONS

This non-provisional application claims priority under 35 U.S.C. §119(a) on Patent Application No(s). 097150509 filed in Taiwan, R.O.C. on Dec. 24, 2008 the entire contents of which are hereby incorporated by reference.

BACKGROUND OF THE INVENTION

1. Field of the Invention

The present invention relates to a method for obtaining a global positioning system (GPS) signal, and more particularly, to a method for obtaining a precise tracking frequency of a GPS signal.

2. Related Art

A global positioning system (GPS) is a medium-range circular-orbit satellite navigation system, which can provide accurate positioning, velocity measurement, and high-precision time standards for most areas (98%) on the surface of the earth. The GPS is developed and maintained by the U.S. Department of Defense for fulfilling the demands of continuously and accurately determining three-dimensional positions, three-dimensional movements, and time for a military user at any place all over the world or in the near-earth space. The system includes 24 GPS satellites in space, 1 master control station, 3 data upload stations and 5 monitor stations, as well as a GPS receiver serving as a user terminal on the earth. Only 4 satellites are needed at least to determine a position and an altitude of the user terminal on the earth rapidly. The larger the number of connected satellites is, the more precise the decoded position is.

Thanks to the features of being free from weather conditions, a high global coverage rate (98%), and moveable positioning, in addition to military applications, the GPS is also widely used for civilian navigation (for example, airplane navigation, ship navigation, and vehicle navigation, etc.) and positioning (for example, vehicle antitheft, positioning of mobile communication devices), etc.

As the satellite orbits the earth, after the GPS has received satellite signals sent from the satellite, the intensities of satellite signals received by the GPS may vary corresponding to a different position of the satellite. For example, when the satellite is right above the GPS, the signal has a higher intensity. When the satellite is close to the ground, the signal has a lower intensity. Meanwhile, the satellite signals may also be deteriorated due to being interfered by other electromagnetic radiations, such that the GPS suffers from a poor signal receiving effect. Meanwhile, according to the Doppler's Law, the signals sent from the satellite may be influenced by a relative movement between the GPS and the satellite or other interference factors, and as a result, the frequency of the satellite signal received by the GPS and that of the signal sent by the satellite might have a slight frequency variation.

Accordingly, in order to receive satellite signals precisely, a GPS uses a plurality of tracking frequencies in a given frequency range to detect a satellite, so as to receive satellite signals sent by the satellite. Furthermore, a phase difference obtained from a previous navigation data is used to correct the current tracking frequency, so as to obtain a next tracking frequency. In other words, a phase difference of a single data is iterated to approximate the tracking frequency.

But under the circumstances that the satellite signal is weak or there are excessively large noise interferences, the phase difference of the single navigation data fails to reflect the actual frequency changes, and thus, no matter how many times the tracking frequency is corrected, the precise tracking frequency cannot be obtained.

SUMMARY OF THE INVENTION

Accordingly, the present invention is directed to a method for obtaining a precise tracking frequency of a global positioning system (GPS) signal, which can solve the problem that a precise tracking frequency cannot be obtained due to the influences of low satellite signal intensity or noises.

A method for obtaining a precise tracking frequency of a GPS signal according to the present invention includes the following steps: Step 1: receiving a plurality of data from a satellite continuously, in which each data has a tracking frequency; Step 2: calculating a plurality of phase differences of the plurality of received data; Step 3: calculating a phase difference average of the plurality of calculated phase differences; Step 4: calculating a frequency difference by the calculated phase difference average and a constant frequency parameter; Step 5: calculating a new tracking frequency by the calculated frequency difference and the tracking frequency of a last data among the plurality of received data; and Step 6: receiving a next data at the new tracking frequency.

Step 1 may include the following steps: detecting a satellite at a plurality of tracking frequencies in a given frequency range, so as to obtain a plurality of satellite signals; taking a tracking frequency of the satellite signal with a greatest energy response among the plurality of obtained satellite signals in the given frequency range as an initial tracking frequency; receiving a satellite signal from the satellite at the initial tracking frequency, so as to obtain a first data among the plurality of data; calculating a phase difference of the first data; calculating a first frequency difference by the calculated phase difference of the first data and the constant frequency parameter; calculating a second tracking frequency by the calculated first frequency difference and the initial tracking frequency; and receiving a satellite signal from the satellite at the second tracking frequency, so as to obtain a second data among the plurality of data.

Step 2 may include calculating a plurality of phase differences of a last given number of data among the plurality of received data. Step 4 may include calculating a product of the calculated phase difference average and the constant frequency parameter, so as to obtain the frequency difference. Step 5 may include summing up the calculated frequency difference and the tracking frequency of the last data among the plurality of received data, so as to obtain a new tracking frequency.

A time interval between each two adjacent phase differences among the plurality of phase differences may be 1 ms. The constant frequency parameter may be 159.155.

The method for obtaining the precise tracking frequency of the GPS signal in the present invention may further include returning to Step 2 to continue to perform Step 2 to Step 6 after a next data is received. Step 2 may include calculating a plurality of phase differences of a last given number of data among the plurality of received data.

In the method for obtaining the precise tracking frequency of the GPS signal according to the present invention, at first, a plurality of data is received from a satellite continuously. Next, a phase difference average is obtained by the plurality of received data. Then, a frequency difference is obtained by calculating a phase difference average and a constant frequency parameter. Next, a new tracking frequency is calculated and obtained by the frequency difference and the tracking frequency of a last data among the plurality of received data, and subsequently, a next data is received at the new tracking frequency. The process of repeatedly obtaining the new tracking frequency by calculating the phase difference averages obtained according to the last given number of data and then receiving the next data at the new tracking frequency can avoid the influences caused by a low satellite signal intensity or noises, thereby achieving the most precise tracking frequency.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
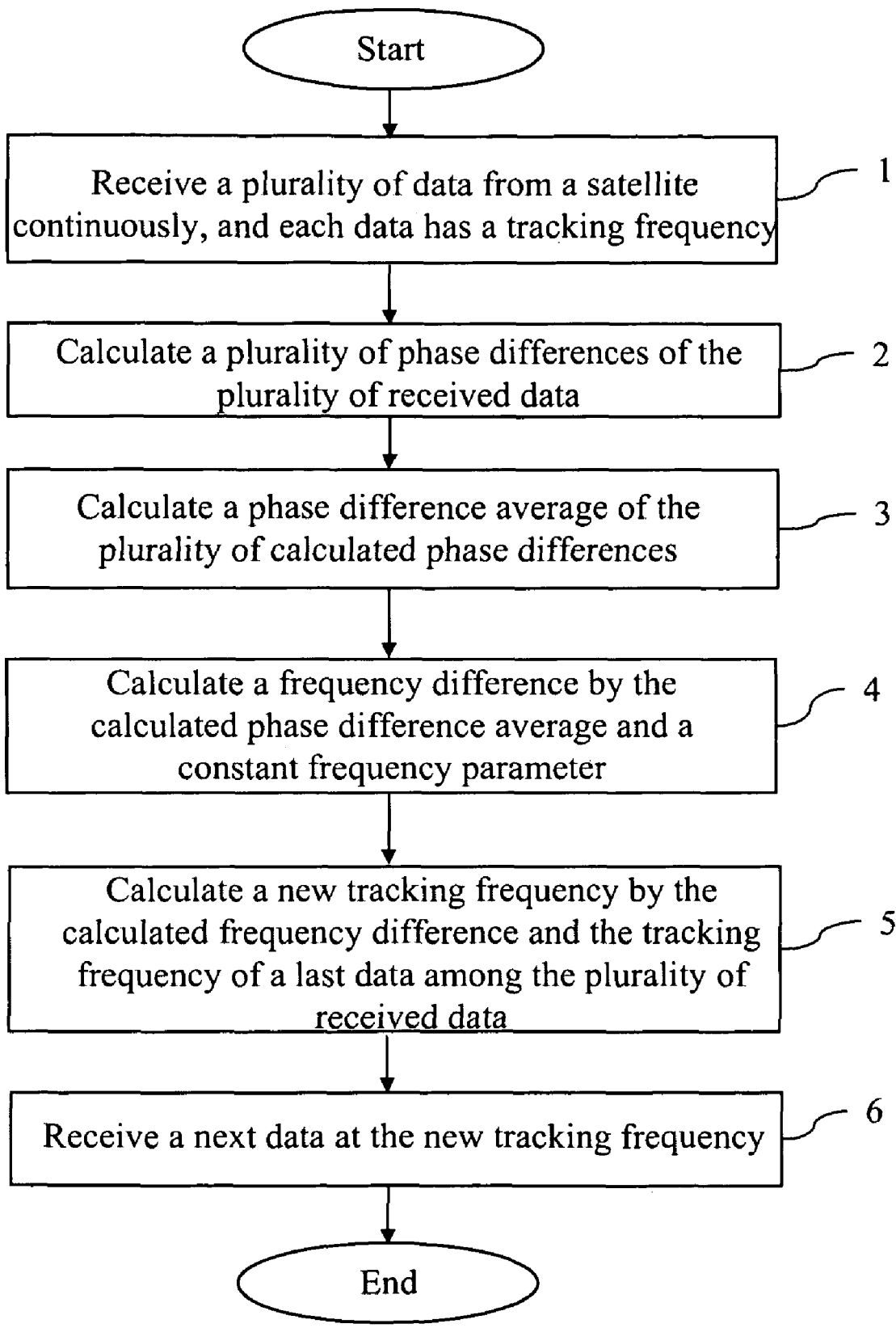
FIG. 1 is a flowchart of a method for obtaining a precise tracking frequency of a GPS signal in a first embodiment according to the present invention.

FIG. 1 is a flowchart of a method for obtaining a precise tracking frequency of a GPS signal in a first embodiment according to the present invention.

Referring to FIG. 1, the method for obtaining the precise tracking frequency of the GPS signal in this embodiment includes the following steps: receiving a plurality of data from a satellite continuously, in which each data has a tracking frequency (Step 1); calculating a plurality of phase differences of the plurality of received data (Step 2); calculating a phase difference average of the plurality of calculated phase differences (Step 3); calculating a frequency difference by the calculated phase difference average and a constant frequency parameter (Step 4); calculating a new tracking frequency by the calculated frequency difference and the tracking frequency of a last data among the plurality of received data (Step 5); and receiving a next data at the new tracking frequency (Step 6).

As the satellite orbits the earth, when a GPS is receiving satellite signals sent from the satellite, the intensities of the satellite signals received by the GPS might vary as the position of the satellite changes. For example, when the satellite is right above the GPS, the atmospheric layer where the signal passes through is relatively thin, so that the signal has a higher intensity. When the satellite is close to the ground, the atmospheric layer where the signal passes through is relatively thick, so that the signal may have a lower intensity. Meanwhile, the satellite signals may also be interfered by other electromagnetic radiations, and as a result, the GPS suffers from a poor signal receiving effect. According to Doppler's Law, the signals sent by the satellite may be influenced by a relative movement between the GPS and the satellite or other interference factors, so that the frequency of the satellite signal received by the GPS and that of the signal sent by the satellite may have a slight frequency variation.

Accordingly, in order to receive satellite signals precisely, a GPS uses a plurality of tracking frequencies in a given frequency range to detect a satellite, so as to receive satellite signals from the satellite. The satellite can be detected at all the plurality of tracking frequencies in the given frequency range. However, only the tracking frequency where the most intense satellite signal is received is the frequency that is most approximate to that of the satellite signal influenced by the Doppler Effect.

Thus, the method for obtaining the precise tracking frequency of the GPS signal according to the present invention includes the following steps. In Step 1, first, a given frequency range is used to search satellites (for example, when three satellites are found, a longitude and a latitude of a position of the GPS can be acquired; when four satellites are found, the longitude, the latitude, as well as an altitude of the GPS can be acquired). After the GPS has searched the satellites, satellite signals sent by the satellites are continuously received at a tracking frequency where a satellite signal with the greatest intensity is received, so as to obtain a plurality of navigation data. Each of the obtained navigation data has a tracking frequency.

Next, a plurality of phase differences of the plurality of received data is calculated (Step 2). After the calculated phase differences are added, and then the result is divided by the number of the plurality of phase differences to acquire a phase difference average (Step 3).

In this embodiment, the phase difference average for correcting the tracking frequency is calculated by the plurality of data, which may greatly reduce interferences caused by noises, so as to obtain a more precise tracking frequency, thereby observing a frequency variation trend.

When calculating the phase differences, phase differences of a last given number of data among the plurality of received data may be calculated. The last given number of data may be the last two data, the last three data, or the last more than four data.

The number of data used for calculating the phase difference average may be set when the GPS leaves the factory, or may also be set by the user definitely. If the total number of the given number of data is too small, due to the influences of low satellite signal intensity or intense noises, a misjudgment is still possible. If the total number of the given number of data is too large, the positioning time may be prolonged, which may possibly cause an additional load to the system. Thus, the given number of data that is taken may be decided according to the intensity of the satellite signal received by the GPS. In other words, the number of data that is taken may be decided according to an application area of the GPS.

A time interval between each two adjacent phase differences may be 1 ms. In other words, a time period for each data is 1 ms.

Next, in Step 4, the phase difference average is multiplied by a constant frequency parameter to obtain a frequency difference. When a time interval for continuously receiving the plurality of data is 1 ms (that is, a time interval for obtaining each two adjacent phase differences is 1 ms), the constant frequency parameter is 159.155.

Then, the calculated frequency difference and the tracking frequency of the last data among the plurality of received data are summed up, so as to obtain a new tracking frequency (Step 5).

Finally, the new tracking frequency is used to receive a satellite signal, so as to receive a next data (Step 6).

The new tracking frequency is calculated by the plurality of data to receive the satellite signal, so that the interferences caused by noises may be greatly reduced, thereby observing the frequency variation trend.

Figure 2:
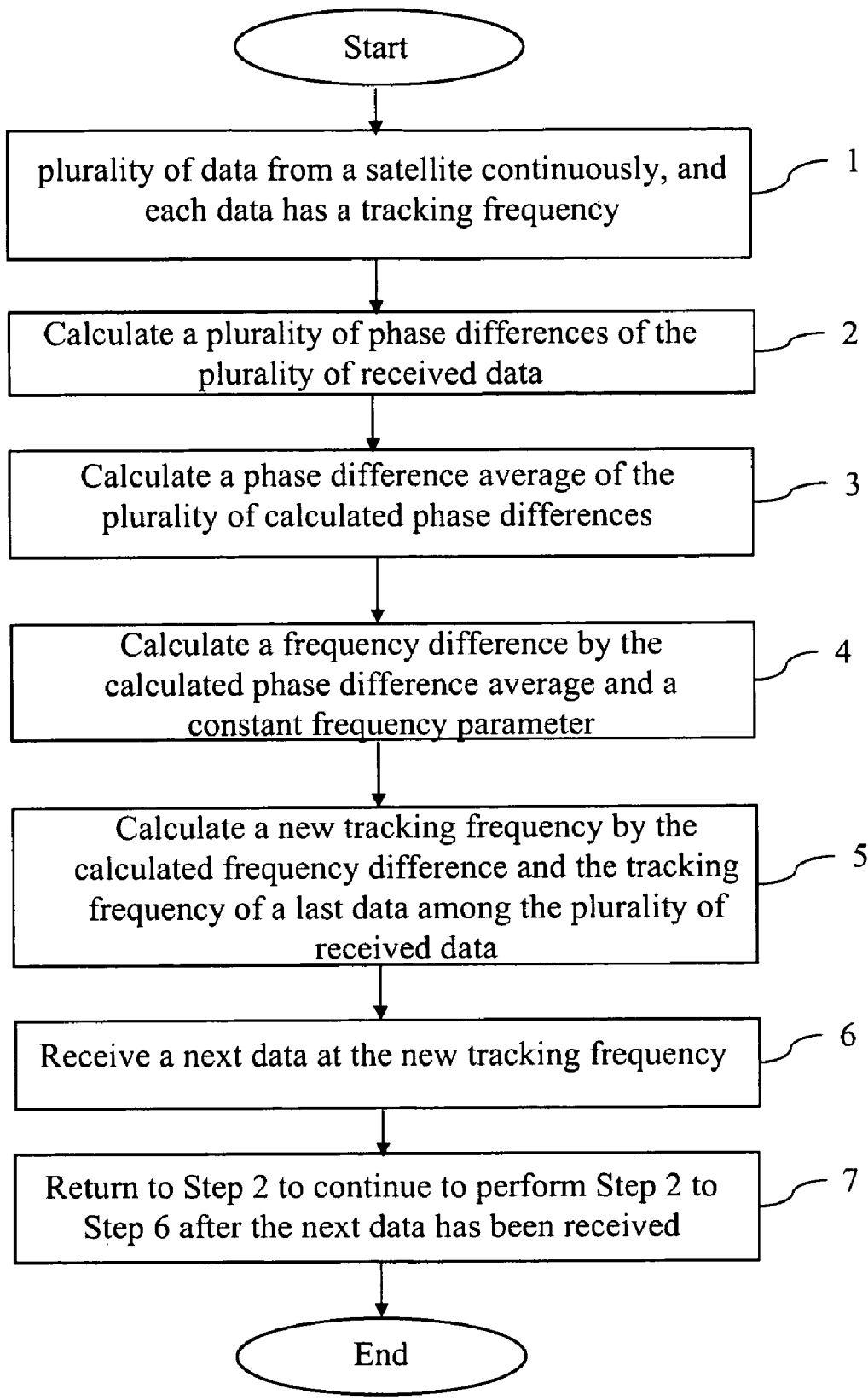
FIG. 2 is a flowchart of a method for obtaining a precise tracking frequency of a GPS signal in a second embodiment according to the present invention.

FIG. 2 is a flowchart of a method for obtaining a precise tracking frequency of a GPS signal in a second embodiment according to the present invention.

Referring to FIG. 2, in conjunction with the above first embodiment, the method for obtaining the precise tracking frequency of the GPS signal further includes: returning to Step 2 to continue to perform Step 2 to Step 6, after a next data has been received (Step 7).

In this embodiment, a phase difference average of a last given number of data is calculated repeatedly, and a new tracking frequency is obtained once again by the calculated phase difference average, a constant frequency parameter, and a tracking frequency of a last data. Then, a next data is received at the new tracking frequency, and thus each time when a data is received, a tracking frequency for the next data is calculated once again. In other words, the precise tracking frequency is hereby approximated through a plurality of iterations of the frequency differences obtained according to the phase differences of the plurality of data, so that the influences caused by low satellite signal intensity or intense noises can be avoided, thereby achieving the precise tracking frequency.

Figure 3:
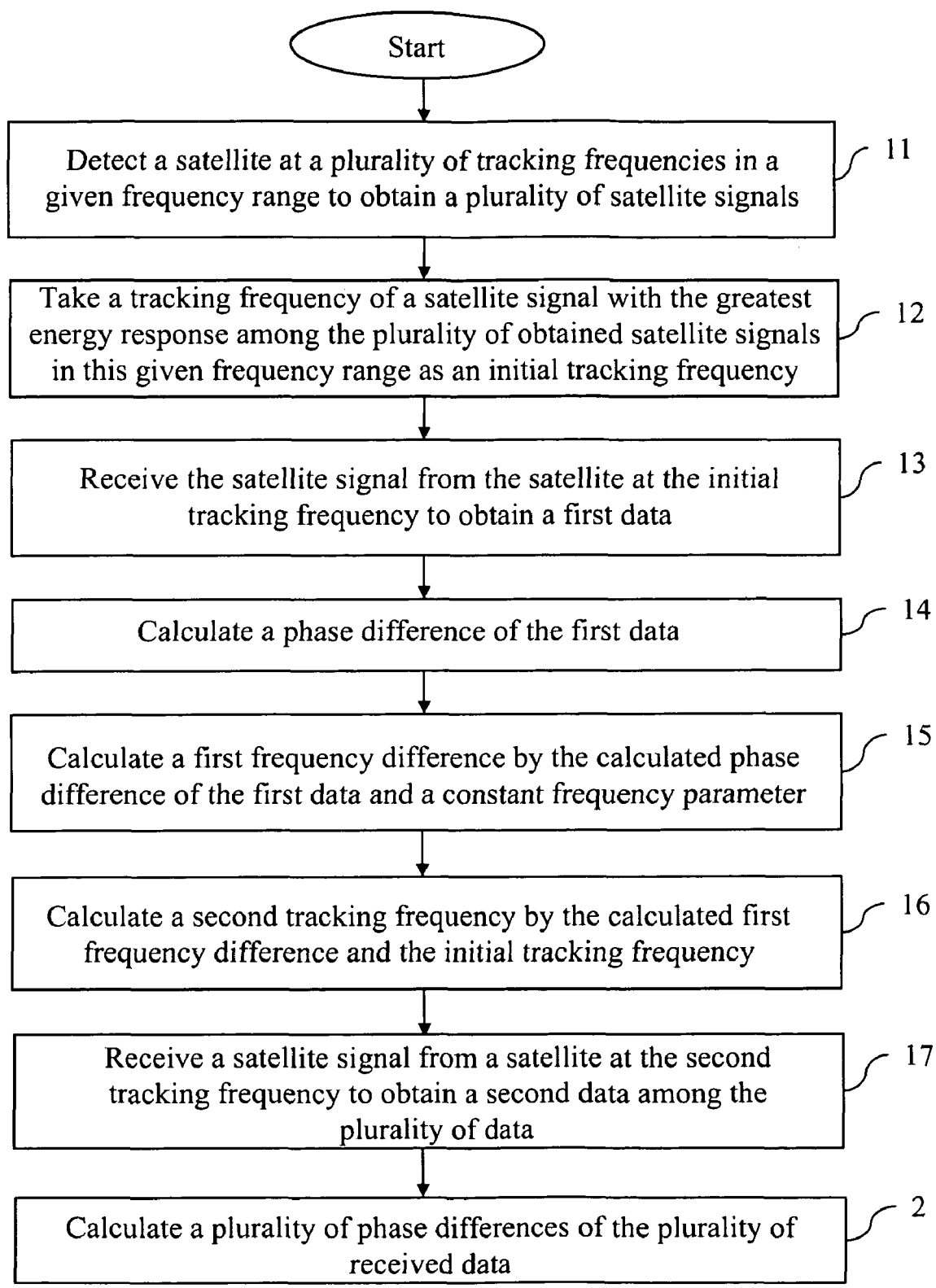
FIG. 3 is a flowchart of a method for obtaining a precise tracking frequency of a GPS signal in a third embodiment according to the present invention.

FIG. 3 is a flowchart of a method for obtaining a precise tracking frequency of a GPS signal in a third embodiment according to the present invention.

To facilitate illustration, calculating the last 5 data is taken as an example here.

Referring to FIG. 3, when a GPS is turned on, first, a satellite is detected at a plurality of tracking frequencies in a given frequency range, so as to obtain a plurality of satellite signals (Step 11).

Next, a tracking frequency of a satellite signal with the greatest energy response among the plurality of obtained satellite signals in this given frequency range is taken as an initial tracking frequency (Step 12).

The satellite signal from the satellite is received at the initial tracking frequency to obtain a first data (Step 13).

A phase difference of the first data is calculated (Step 14).

Then, a product of the phase difference of the first data and a constant frequency parameter is calculated to obtain a first frequency difference (Step 15).

Next, a sum of the first frequency difference and the initial tracking frequency is calculated to obtain a second tracking frequency (Step 16).

Then, a satellite signal from a satellite is received at the second tracking frequency to obtain a second data (Step 17).

After the second data is obtained, by means of calculating a sum of a last data and a product of the phase difference average of the received data and the constant frequency parameter, a tracking frequency of a next data is obtained. A new tracking frequency is calculated repeatedly in this way, until a fifth data is obtained.

In other words, after the second data is obtained, by calculating a sum of the tracking frequency of the second data and a product of a phase difference average of the first data and the second data and the constant frequency parameter, a third tracking frequency is obtained. Meanwhile, a satellite signal from a satellite is received at the third tracking frequency, so as to obtain a third data.

After the third data is received, by calculating a sum of the third tracking frequency and a product of a phase difference average of the first data, the second data, and the third data and the constant frequency parameter, a fourth tracking frequency is obtained. Furthermore, a satellite signal from a satellite is received at the obtained fourth tracking frequency, so as to obtain a fourth data.

After the fourth data is received, by calculating a sum of the fourth tracking frequency and a product of a phase difference average of the first data, the second data, the third data, and the fourth data and the constant frequency parameter, a fifth tracking frequency is obtained. Furthermore, a satellite signal from a satellite is received at the obtained fifth tracking frequency, so as to obtain a fifth data.

After the fifth data is received, by calculating a sum of the fifth tracking frequency and a product of a phase difference average of the first data, the second data, the third data, the fourth data, and the fifth data and the constant frequency parameter, a sixth tracking frequency is obtained. Furthermore, a satellite signal from a satellite is received at the obtained sixth tracking frequency, so as to obtain a sixth data.

Next, after the sixth data is received, by calculating a sum of the last data and a product of a phase difference average of the last received five data and the constant frequency parameter, a tracking frequency of a next data is obtained. A new tracking frequency is calculated repeatedly in this way, so as to update a tracking frequency of a subsequent data.

In other words, after the sixth data is received, by calculating a sum of a sixth tracking frequency and a product of a phase difference average of the second data, the third data, the fourth data, the fifth data, and the sixth data and the constant frequency parameter, a seventh tracking frequency is obtained. Furthermore, a satellite signal from a satellite is received at the obtained seventh tracking frequency, so as to obtain a seventh data.

After the seventh data is received, by calculating a sum of a seventh tracking frequency and a product of a phase difference average of the third data, the fourth data, the fifth data, the sixth data, and the seventh data and the constant frequency parameter, an eighth tracking frequency is obtained. Furthermore, a satellite signal from a satellite is received at the obtained eighth tracking frequency, so as to obtain an eighth data, and so forth.

In the method for obtaining the precise tracking frequency of the GPS signal according to the present invention, the precise tracking frequency is approximated through an iteration of the frequency difference. As compared with the iteration of the phase difference for a single data in the prior art, the method of the present invention can obtain the precise tracking frequency easily and rapidly. As shown in Table 1, when the received satellite signal has a higher intensity, for example, −120 dBm, the method for obtaining the precise tracking frequency of the GPS signal according to the present invention only requires five data to obtain the precise tracking frequency, whereas 10 times of iterations are required to obtain the precise tracking frequency in the prior art. When the received satellite signal has a lower intensity, for example, −136 dBm, the method for obtaining the precise tracking frequency of the GPS signal according to the present invention only requires 200 data to obtain the precise tracking frequency, whereas the tracking fails in the prior art since too many times of iterations are required.

TABLE 1

Number of data required under different satellite signal intensities for the present invention and the prior art

| Satellite Signal Intensity | Minimum Number of Data Required | Iterations Required in Prior Art |
| --- | --- | --- |
| −120 dBm (High) | 5 | 10 |
| −124 dBm | 10 | 20 |
| −128 dBm | 20 | 100 |
| −132 dBm | 80 | 300 |
| −136 dBm (Low) | 200 | Tracking fails. |

The method for obtaining the precise tracking frequency of the GPS signal according to the present invention can be applied to an electronic device with a GPS, for example, portable electronic devices such as a cellular phone, a notebook computer or a single-unit device (for example, a GPS receiver). An electronic device with a GPS may have an antenna, a storage unit, and a processor. The method for obtaining the precise tracking frequency of the GPS signal according to the present invention can be built in the storage unit by a software program or a firmware program. The antenna is used to receive satellite signals from a plurality of satellites. The built-in software or firmware program is then executed by the processor. Thus, after the data in the satellite signals are received, the phase difference average of the plurality of data is interpreted to calculate the frequency difference. Finally, the frequency difference is iterated back to the tracking frequency of the last satellite signal, so as to obtain a new tracking frequency.

Therefore, in the method for obtaining the precise tracking frequency of the GPS signal according to the present invention, a plurality of received data is used to obtain a phase difference average, and then a frequency difference is calculated by the phase difference average and a constant frequency parameter, and then a new tracking frequency is calculated according to the frequency difference and the tracking frequency of the last data, thereby receiving a next data at the new tracking frequency. In this manner, the interferences caused by noises can be greatly reduced, so as to obtain the most precise tracking frequency, thereby observing the frequency variation trend.

What is claimed is:

1. A method for obtaining a precise tracking frequency of a global positioning system (GPS) signal, comprising:
   Step 1: receiving a plurality of data from a satellite continuously, wherein each data has a tracking frequency;
   Step 2: calculating a plurality of phase differences of the plurality of received data;
   Step 3: calculating a phase difference average of the plurality of calculated phase differences;
   Step 4: calculating a frequency difference by the calculated phase difference average and a constant frequency parameter;
   Step 5: calculating a new tracking frequency by the calculated frequency difference and the tracking frequency of a last data among the plurality of received data; and
   Step 6: receiving a next data at the new tracking frequency.

2. The method for obtaining a precise tracking frequency of a GPS signal according to claim 1, wherein a time interval between each two adjacent phase differences among the plurality of phase differences is 1 ms.

3. The method for obtaining a precise tracking frequency of a GPS signal according to claim 1, wherein the constant frequency parameter is 159.155.

4. The method for obtaining a precise tracking frequency of a GPS signal according to claim 1, wherein Step 1 comprises:
   detecting the satellite at a plurality of tracking frequencies in a given frequency range, so as to obtain a plurality of satellite signals;
   taking a tracking frequency of the satellite signal with a greatest energy response among the plurality of obtained satellite signals in the given frequency range as an initial tracking frequency;
   receiving the satellite signal from the satellite at the initial tracking frequency, so as to obtain a first data among the plurality of data;
   calculating a phase difference of the first data;
   calculating a first frequency difference by the calculated phase difference of the first data and the constant frequency parameter;
   calculating a second tracking frequency by the calculated first frequency difference and the initial tracking frequency; and
   receiving the satellite signal from the satellite at the second tracking frequency, so as to obtain a second data among the plurality of data.

5. The method for obtaining a precise tracking frequency of a GPS signal according to claim 1, wherein Step 2 comprises:
   calculating a plurality of phase differences of a last given number of data among the plurality of received data.

6. The method for obtaining a precise tracking frequency of a GPS signal according to claim 1, further comprising:
   returning to Step 2 to continue to perform Step 2 to Step 6 after the next data is received.

7. The method for obtaining a precise tracking frequency of a GPS signal according to claim 6, wherein Step 2 comprises:
   calculating a plurality of phase differences of a last given number of data among the plurality of received data.

8. The method for obtaining a precise tracking frequency of a GPS signal according to claim 1, wherein Step 4 comprises:
   calculating a product of the calculated phase difference average and the constant frequency parameter, so as to obtain the frequency difference.

9. The method for obtaining a precise tracking frequency of a GPS signal according to claim 1, wherein Step 5 comprises:
   summing up the calculated frequency difference and the tracking frequency of the last data among the plurality of received data, so as to obtain the new tracking frequency.

* * * * *